United States Patent [19]

Yoshino

[11] Patent Number: 5,425,095
[45] Date of Patent: Jun. 13, 1995

[54] AUTOMATIC DIALING APPARATUS WITH NUMERICAL PAUSE TIME SETTING

[75] Inventor: Motoaki Yoshino, Kawasaki, Japan

[73] Assignee: Canon Kabushiki Kaisha, Tokyo, Japan

[21] Appl. No.: 249,059

[22] Filed: May 25, 1994

Related U.S. Application Data

[63] Continuation of Ser. No. 979,078, Nov. 19, 1992, abandoned.

[30] Foreign Application Priority Data

Dec. 9, 1991 [JP] Japan ................. 3-350035

[51] Int. Cl.⁶ .................. H04M 1/272; H04M 1/26
[52] U.S. Cl. ..................... 379/355; 379/356
[58] Field of Search ............ 379/353, 354, 355, 356, 379/357, 63, 100, 110, 216

[56] References Cited

U.S. PATENT DOCUMENTS

| | | | |
|---|---|---|---|
| 4,220,820 | 9/1980 | Mallien, II | 379/63 |
| 4,342,882 | 8/1982 | Gravenhorst et al. | 379/355 |
| 4,521,648 | 6/1985 | Hegi | 379/357 |
| 4,571,463 | 2/1986 | Shefler | 379/355 |
| 4,661,976 | 4/1987 | Basch | 379/355 |
| 4,661,977 | 4/1987 | Howett | 379/355 |
| 4,741,029 | 4/1988 | Hase et al. | 379/359 |
| 4,769,835 | 9/1988 | Hirth et al. | 379/355 |
| 4,805,212 | 2/1989 | Hase et al. | 379/355 |
| 4,825,463 | 4/1989 | Miura | 379/355 |
| 4,885,580 | 12/1989 | Noto et al. | 379/354 |
| 4,944,000 | 7/1990 | Hishiki | 379/362 |
| 4,980,910 | 12/1990 | Oba et al. | 379/355 |
| 5,299,261 | 3/1994 | Bogart et al. | 379/354 |

*Primary Examiner*—James L. Dwyer
*Assistant Examiner*—Scott L. Weaver
*Attorney, Agent, or Firm*—Fitzpatrick, Cella, Harper & Scinto

[57] ABSTRACT

In an operation of setting a pause when registering a dial number, if a pause key is not input in immediate succession for a predetermined number of times, first pause data for generating a predetermined pause time is stored. If the pause key is input in immediate succession for a predetermined number of times, a mode for setting a pause time is provided, and second pause data for generating a pause corresponding to input time data is stored. When performing a call, a pause corresponding to stored pause data is generated.

17 Claims, 4 Drawing Sheets

| | |
|---|---|
| [0] | 0 |
| [P] | 0P |
| [P] | P=? |
| [5] | 0P5/ |
| [0] | 0P5/0 |
| [3] | 0P5/03 |
| [3] | 0P5/033 |
| [7] | 0P5/0337 |
| [5] | 0P5/03375 |
| [8] | 0P5/033758 |
| [2] | 0P5/0337582 |
| [1] | 0P5/03375821 |
| [1] | 0P5/033758211 |
| [1] | 0P5/0337582111 |

FIG.4

| | |
|---|---|
| [0] | 0 |
| [P] | 0P |
| [P] | P=? |
| [5] | 0P5/ |
| [0] | 0P5/0 |
| [3] | 0P5/03 |
| [3] | 0P5/033 |
| [7] | 0P5/0337 |
| [5] | 0P5/03375 |
| [8] | 0P5/033758 |
| [2] | 0P5/0337582 |
| [1] | 0P5/03375821 |
| [1] | 0P5/033758211 |
| [1] | 0P5/0337582111 |

AUTOMATIC DIALING APPARATUS WITH NUMERICAL PAUSE TIME SETTING

This application is a continuation of application Ser. No. 07/979,078, filed Nov. 19, 1992, (now abandoned).

BACKGROUND OF THE INVENTION

1. Field of the Invention

This invention relates to an automatic dialing apparatus which stores telephone numbers and automatically transmits a dial signal in accordance with a stored telephone number by a simple operation, and more particularly, to an automatic dialing apparatus which can variably set a pause time which is necessary when, for example, the apparatus is connected to an extension of an automatic switching system.

2. Description of the Related Art

A conventional automatic dialing apparatus, connected to an extension of an automatic switching system, generally first performs zero calling when calling an external subscriber. Since the time period at which it becomes possible to transmit a dial signal to the outside subscriber, after the zero calling, differs depending on the switchboard, a call may not be performed by an automatic dialing apparatus if the pause time after zero calling is fixed.

In order to provide variable pause times after zero calling, a method disclosed in Japanese Utility Model Publication No. 62-11100 (1987) has, for example, been known.

In this method, a pause key is provided. In accordance with n times of operations of the key, n pause codes are stored, and in accordance with the stored n pause codes, a pause time which equals n times a unit time is generated.

However, in the above-described method in which the pause key is depressed a plurality of times corresponding to the required pause time, and the corresponding pause codes are stored in a memory, only pause times equal to nt seconds can be set, where n is an integer, and a pause time corresponding to one pause code is represented by t seconds.

Accordingly, if the time t is set to t=3 which corresponds to a response time of about 3 seconds for catching an external subscriber adopted in a majority of switchboards, the number n must be set to n=2 (6 seconds) when the apparatus is connected to a switchboard having a response time of about 4 seconds. Thus, a useless time of about 2 seconds results.

If the time t is set to t=1 in order to minimize such useless time, the number n must always be set to n=3 if the apparatus is connected to a switchboard having a response time of about 3 seconds for catching an external subscriber, which is adopted in a majority of switchboards. Hence, the pause key must always be depressed three times, on unnecessarily troublesome operation. Furthermore, a case may arise in which all the digits of the subscriber's telephone number cannot be stored within the memory since the stored pause codes occupy a considerable part of the memory.

SUMMARY OF THE INVENTION

It is an object of the present invention to overcome the above-described problems in the prior art.

It is another object of the present invention to provide an improved automatic dialing apparatus.

It is still another object of the present invention to provide an automatic dialing apparatus in which an arbitrary pause time can easily be set.

These and other objects, advantages and features of the present invention will become more apparent from the following detailed description of the preferred embodiments taken in conjunction with the accompanying drawings.

BRIEF DESCRIPTION OF THE DRAWINGS

FIG. 4 is a schematic diagram illustrating an example of display in another embodiment of the present invention.

DETAILED DESCRIPTION OF THE PREFERRED EMBODIMENTS

A preferred embodiment of the present invention will now be described in detail with reference to the drawings.

Figure 1:
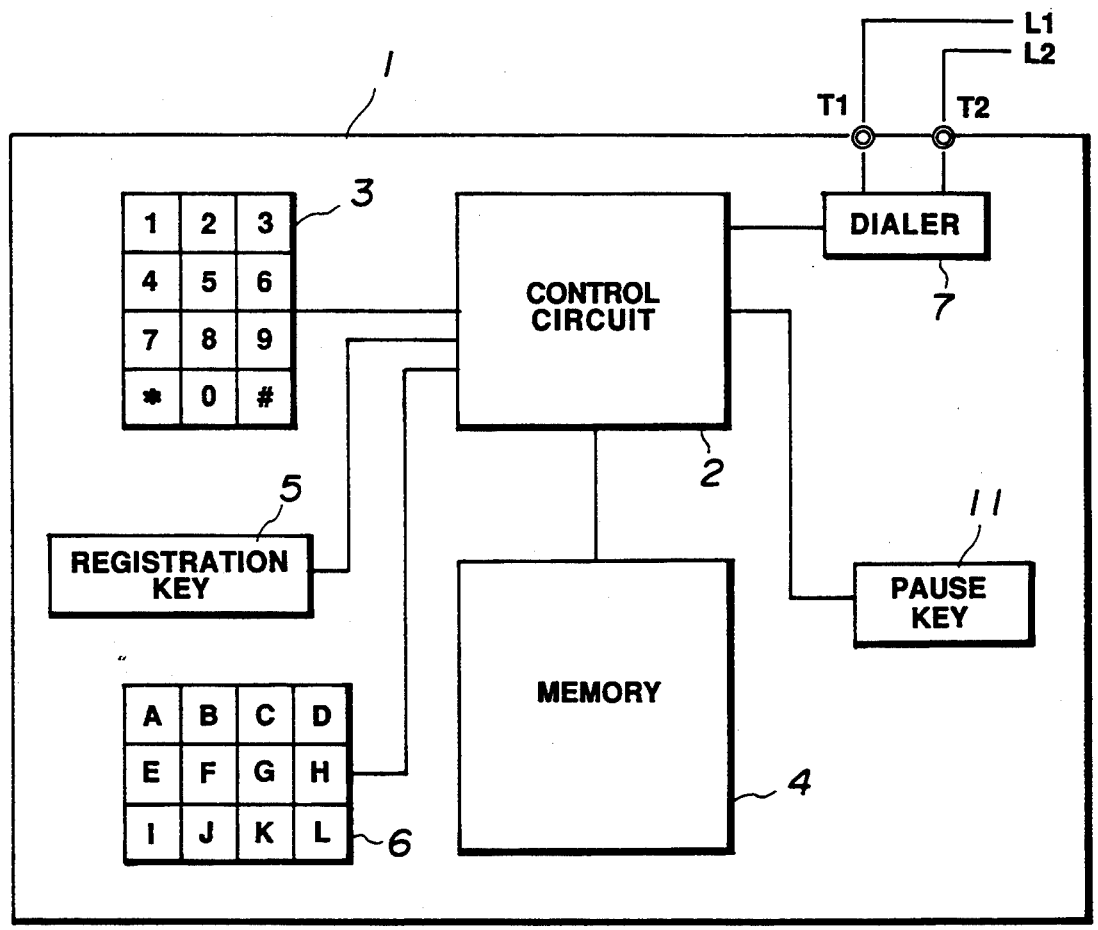
FIG. 1 is a block diagram showing the configuration of an automatic dialing apparatus according to an embodiment of the present invention.

FIG. 1 is a block diagram showing the configuration of an automatic dialing apparatus of one embodiment.

The automatic dialing apparatus 1 includes a control circuit 2, comprising a microprocessor, a ROM (read-only memory), a RAM (random access memory) and the like, a key input unit 3 for inputting telephone-number data, a memory 4 for storing the input telephone-number data, a registration key 5 for setting the memory 4 in a registration state, a one-touch key 6 for accessing telephone-number data in the memory 4, a pause key 11, and a dialer unit 7 for outputting dial pulses or a DTMF (dual tone multifrequency) signal to telephone lines L1 and L2 via connection terminals T1 and T2 in response to a dial-signal outputting signal from the control circuit 2.

In the present embodiment, the setting of a pause time while a dial number is registered is performed in the following way.

First, by operating the key input unit 3, ASCII (American Standard Code for Information Interchange) codes $30_{(hex)}$–$39_{(hex)}$, and $2A_{(hex)}$ and $23_{(hex)}$ are generated in response to depression of numerical keys 0–9, and keys * and #, respectively.

An ASCII code $50_{(hex)}$ is generated in response to depression of the pause key 11.

Figure 2:
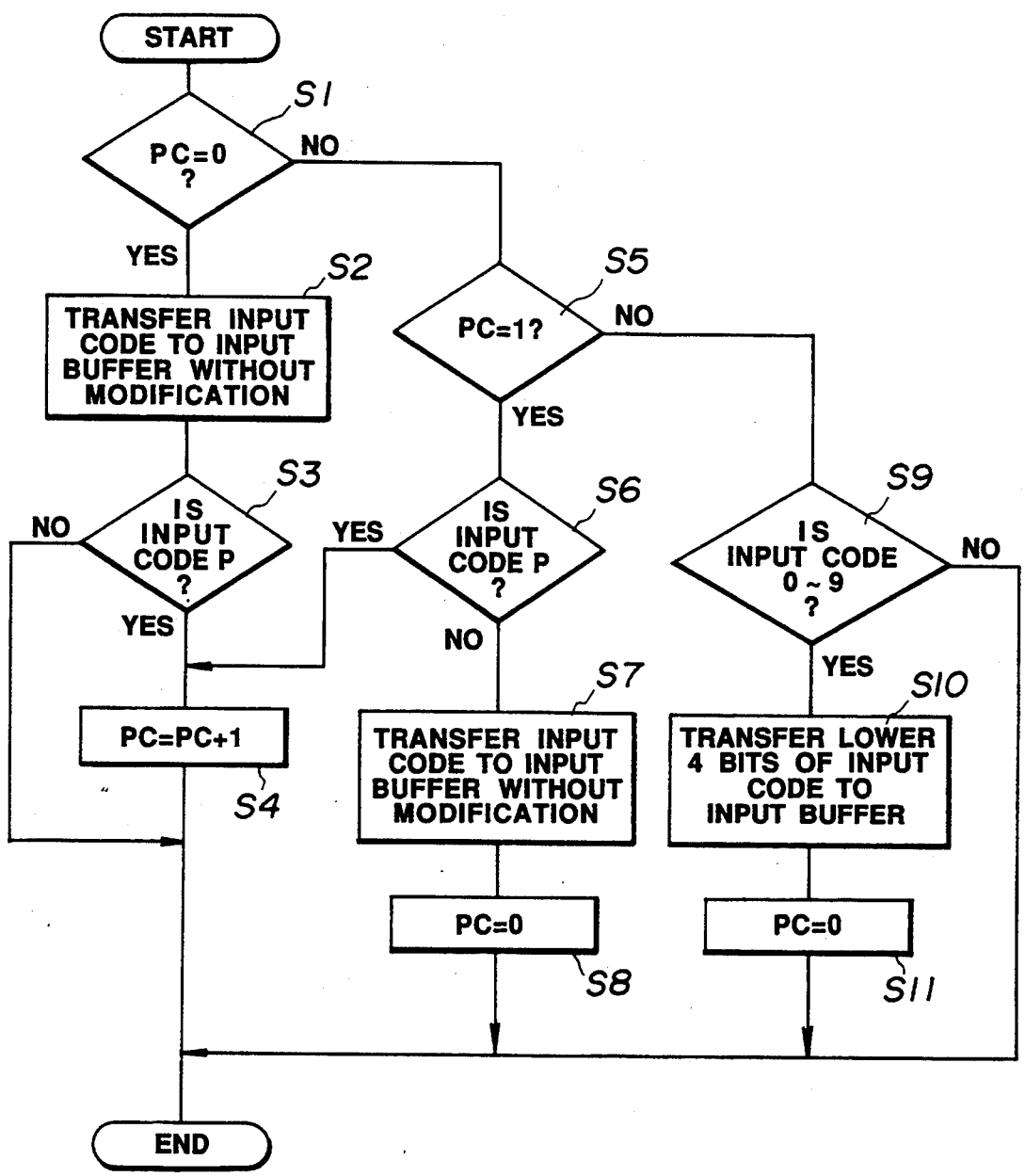
FIGS. 2 and 3 are flowcharts showing the operations in the embodiment.

FIG. 2 is a flowchart showing the operation when registering a pause time in the present embodiment.

The RAM of the control circuit 2 includes a counter for input number of digits, a key input buffer, a pause input counter and the like. Code information transmitted from the key input unit 3 is sequentially stored in the key input buffer according to the flowchart shown in FIG. 2. If the one touch key 6 is then depressed, data in the input buffer are transferred to and stored in a region within the memory 4 corresponding to the one-touch key 6.

In FIG. 2, it is determined whether or not the value of the pause input counter (PC) is 0 (step S1). If PC=0, input-code information is transferred to the key input buffer without modification (step S2). Subsequently, it is determined whether or not the transferred input code is a pause code (step S3). If the result of the determination is affirmative, the value of the pause input counter is incremented by one (step S4).

If the result of the determination in step S1 is negative, it is determined whether or not PC=1 in step S5. If the result of the determination is affirmative, it is determined whether or not the input code is a pause code in step S6. If the result of the determination in step S5 is affirmative and the result of the determination in step S6 is negative, the code information is transferred to the key input buffer without modification (step S7), and the pause input counter is reset (step S8).

If the result of the determination in step S6 is affirmative, the code information is not transferred to the input key buffer, and the value of the pause input counter is incremented by one (step S4).

A case in which the value of the pause input counter equals at least 2 corresponds to a pause-time input mode, and it is determined in step S9 whether or not the input code comprises 0-9 (ASCII code $30_{(hex)}$-$39_{(hex)}$). If the result of the determination is affirmative, lower bits ($00_{(hex)}$-$09_{(hex)}$) of the input code are transferred to the input buffer in step S10, and the pause input counter is reset to 0 in step S11. Input of a code other than 0-9 is ignored.

Figure 3:
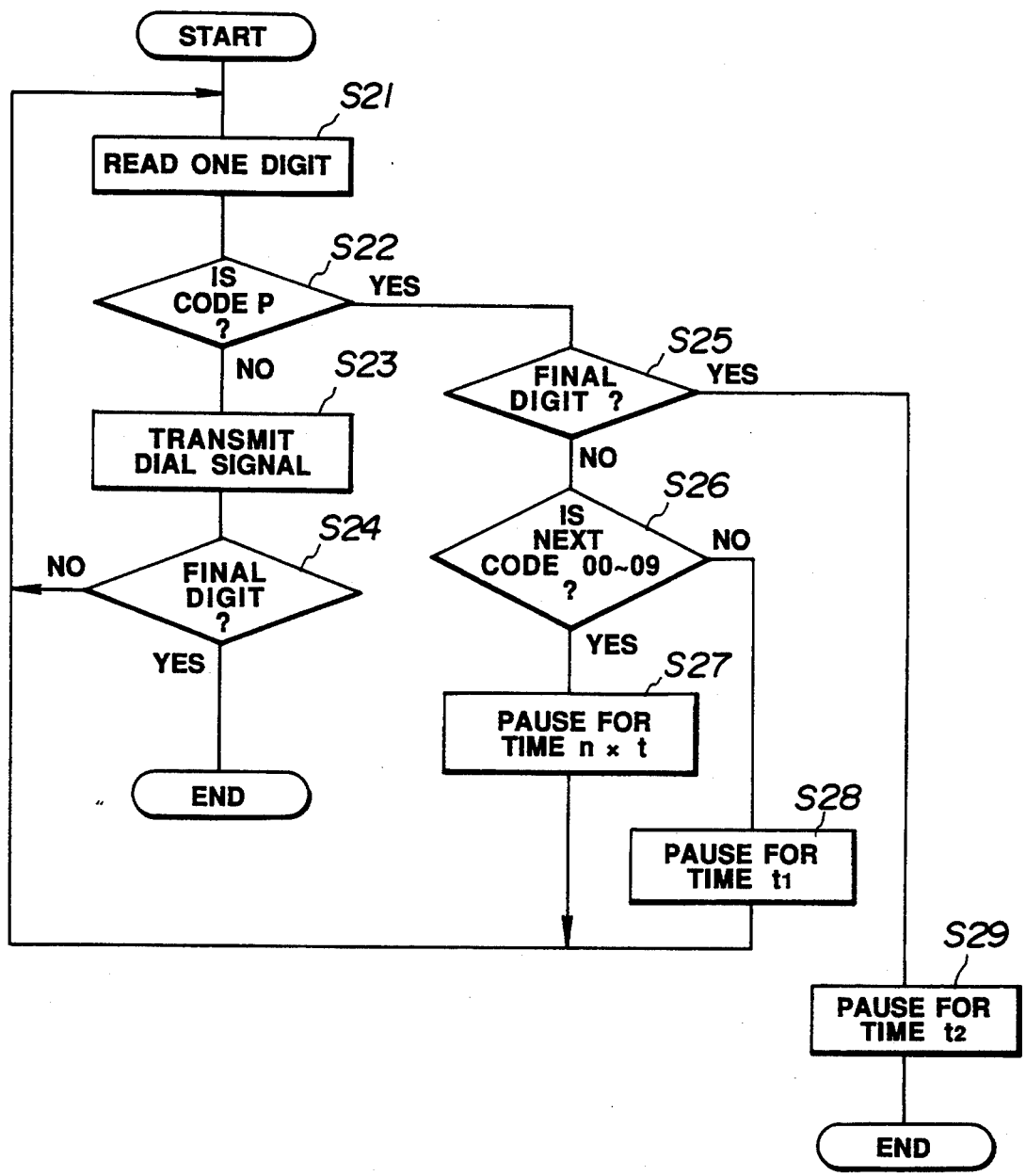

FIG. 3 is a flowchart showing the operation when dial calling is performed in the present embodiment.

If the one-touch key 6 is depressed at a dialing operation, individual digits of data of the region within the memory 4, corresponding to the one-touch key 6, are sequentially read by the control circuit 2 (step S21). Such reading operations are performed for a predetermined number of digits.

It is determined whether or not a one-digit code read in step S21 is a pause code (step S22). If the result of the determination is negative, a dial signal is transmitted by controlling the dialer unit 7 (step S23). Subsequently, it is determined whether or not the read code is the final digit (step S24). If the result of the determination is negative, the process returns to step S21, where reading of the next digit is performed.

If the result of the determination in step S22 is affirmative, it is determined whether or not the code is the final digit (step S25). If the result of the determination in step S25 is negative, it is determined whether or not the next-digit code comprises ($00_{(hex)}$-$09_{(hex)}$) (step S26).

The affirmative result of the determination in step S26 indicates setting of a pause time. Hence, a pause having a value of the read code n x the unit time t seconds is executed (step S27).

The negative result of the determination in step S26 indicates that a pause time is not set, and a pause code is separately set. Hence, a pause having a default value seconds is executed (step S28).

If the result of the determination in step S25 is affirmative, a pause having a default value $t_2$ seconds is executed (step S29). In the present embodiment, t=1 second, $t_1$=3 seconds, and $t_2$=20 seconds.

The above-described pause for the final digit is provided in order to deal with a delay in connection to an international network or the like when, for example, the automatic dialing apparatus is a facsimile apparatus.

In the above-described embodiment a description has been provided of the case in which the automatic dialing apparatus does not include a display unit. In another embodiment in which a display unit is provided, display is performed in the following manner. If the pause key is depressed once, a symbol P indicating a pause is displayed as input display. If the pause key is depressed once in a state in which the symbol P is displayed at the final digit, a notation "P=?" is displayed so as to clarify that a mode of setting a pause time is provided.

FIG. 4 is a schematic diagram illustrating an example of such display.

In performing one-touch dial registration for calling 03 3758 2111 after zero calling, display of the input buffer is once stopped after the second word P has been depressed, and a notation "P=?" is displayed in order to urge the user to input a pause time. If the pause time is set to 5 seconds by inputting 5, the display of the input buffer is resumed. In addition, a symbol "/" is displayed in order to clarify the position where the telephone number starts.

Alternatively, in a display unit which can display numerals in a character style different from a normal style (such as a Gothic style, a numeral surrounded by a circle, or the like), the pause time may be displayed in such a style.

As described above, according to the above-described embodiments when calling an external subscriber from an automatic dialing apparatus connected to an extension of an automatic switching system, a pause after performing, for example, zero calling, can be arbitrarily set with a simple operation while suppressing useless consumption of a memory.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

The automatic dialing apparatus of the present invention may be applied to various kinds of communication apparatuses, such as telephone sets, facsimile apparatuses, Telex apparatuses and the like.

I claim:

1. An automatic dialing apparatus, comprising:
   storage means for storing telephone-number data and pause data for specifying a pause time;
   first key input means for inputting numerical data;
   second key input means for inputting a pause code; and
   control means for determining whether or not said second key input means is actuated in immediate succession a predetermined number of times, and storing the pause code, and the pause time which corresponds to the numerical data input by a numerical key of said first key input means, in said storage means, when said second key input means is actuated in immediate succession the predetermined number of times.

2. An apparatus according to claim 1, wherein the pause data comprises the pause code and the numerical data, input by the numerical key of said first key input means, specifying the pause time.

3. An apparatus according to claim 2, wherein, when a user dial a telephone number, said control means determines whether or not data read from said storage means comprises the pause code, determines whether or not data following the data read from said storage means, in said storage means, comprises the numerical data specifying the pause time if the pause code has been read, generates a pause having a predetermined time if the data following the data read from said storage means does not comprise the numerical data specifying the pause time, and generates a pause having a time corresponding to the numerical data specifying the pause time if the data following the data read from said storage means comprises the numerical data specifying the pause time.

4. An apparatus according to claim 1, wherein said control means stores second pause data for setting a predetermined pause time in said storage means in response to a single actuation of said second key input means when said second key input means is not actuated in succession for the predetermined number of times.

5. An apparatus according to claim 4, wherein the second pause data consists of a single pause code.

6. An apparatus according to claim 1, wherein said control means performs a call and generates the pause time in accordance with the pause data in said storage means in response to receiving an instruction to place a call from said instruction means.

7. A method of setting a pause time for dialing, said method comprising the steps of:
- determining whether or not a pause key for setting a pause code is actuated in immediate succession a predetermined number of times;
- storing pause data, for generating a pause having a time corresponding to numerical data input by a numerical key, in a memory, when the pause key is actuated in immediate succession the predetermined number of times; and
- generating the pause time in accordance with the stored pause data in the memory when a call is performed.

8. A method according to claim 7, wherein the pause data comprises the pause code and the numerical data, input by the numerical key, indicating the pause time.

9. A method according to claim 7, wherein second pause data for generating a pause having a predetermined time is stored in the memory in response to a single actuation of the pause key when the pause key is not actuated in succession for the predetermined number of times in said storing step.

10. A method according to claim 9, wherein the second pause data consists of a single pause code.

11. A method according to claim 7, wherein the call is performed in response to an instruction to place the call.

12. A method of setting a pause time for a speed dialing operation, said method comprising the steps of:
- detecting whether or not a predetermined operation of a pause key has been performed;
- storing pause data for specifying a pause time into a memory, said pause time determined by numerical data input by a numerical key, if the predetermined operation of the pause key is detected in said detecting step as having been performed;
- discriminating whether or not the pause data is stored in the memory corresponding to a speed dialing number; and
- making a pause having a time corresponding to the pause data when the pause data is stored corresponding to the speed dialing number.

13. A method according to claim 12, wherein the predetermined operation of the pause key includes a repeated number of depressions of the pause key.

14. A method according to claim 12, wherein the pause data consists of a pause code and the numerical data input by the numerical key.

15. A method according to claim 12, wherein second pause data, for making a pause having a predetermined time is stored in the memory in said storing step when said detecting step detects that the predetermined operation of the pause key has not been performed.

16. A method according to claim 15, wherein the second pause data consists of a single pause code.

17. A method according to claim 12, wherein the speed dialing operation includes depression of a one-touch speed dialing key.

* * * * *

UNITED STATES PATENT AND TRADEMARK OFFICE
CERTIFICATE OF CORRECTION

PATENT NO. : 5,425,095
DATED : June 13, 1995
INVENTOR(S) : MOTOAKI YOSHINO

It is certified that error appears in the above-identified patent and that said Letters Patent is hereby corrected as shown below:

COLUMN 1

Line 58, "on" should read --an--.

COLUMN 6

Line 31, "time" should read --time,--.

Signed and Sealed this

Fourteenth Day of November, 1995

Attest:

BRUCE LEHMAN

*Attesting Officer*          *Commissioner of Patents and Trademarks*